United States Patent [19]

Maucher et al.

[11] Patent Number: 4,681,199
[45] Date of Patent: Jul. 21, 1987

[54] APPARATUS FOR TRANSMITTING TORQUE IN MOTOR VEHICLES

[75] Inventors: Paul Maucher, Sasbach; Oswald Friedmann, Lichtenau, both of Fed. Rep. of Germany

[73] Assignee: Luk Lamellen und Kupplungsbau GmbH, Bühl, Fed. Rep. of Germany

[21] Appl. No.: 848,730

[22] Filed: Apr. 4, 1986

[30] Foreign Application Priority Data

| Apr. 4, 1985 | [DE] | Fed. Rep. of Germany | 3512372 |
| May 10, 1985 | [DE] | Fed. Rep. of Germany | 3516907 |
| Sep. 7, 1985 | [DE] | Fed. Rep. of Germany | 3532005 |

[51] Int. Cl.$^4$ .............. F16D 13/69; F16D 47/02; F16D 43/14
[52] U.S. Cl. .............. 192/70.23; 192/70.27; 192/48.3; 192/105 B; 192/65
[58] Field of Search .............. 192/48.3, 70.16, 70.17, 192/70.18, 70.23, 70.24, 70.27, 103 A, 103 B, 103 C, 105 A, 105 B, 65, 89 B

[56] References Cited

U.S. PATENT DOCUMENTS

| 2,203,117 | 6/1940 | Whatmough | 192/105 B |
| 4,206,824 | 6/1980 | Klink | 192/3.31 X |
| 4,274,524 | 6/1981 | Nakane | 192/48.3 |
| 4,305,493 | 12/1981 | Silberschlag | 192/3.31 X |
| 4,425,991 | 1/1984 | Hays | 192/70.27 |

FOREIGN PATENT DOCUMENTS 1090103  9/1960  Fed. Rep. of Germany ... 192/105 B

Primary Examiner—George H. Krizmanich
Attorney, Agent, or Firm—Peter K. Kontler

[57] ABSTRACT

One or more slip friction clutches are interposed between two flywheels in the power train between the crankshaft of the engine and the input shaft of the change-speed transmission in a motor vehicle. The torque which is transmitted by at least one of the slip clutches is variable in the drive direction and/or in the coast direction.

57 Claims, 12 Drawing Figures (V-V)

(VII-VII)

(XI-XI)

(XII-XII)

APPARATUS FOR TRANSMITTING TORQUE IN MOTOR VEHICLES

CROSS-REFERENCE TO RELATED CASE

The apparatus of the present invention is somewhat similar to that disclosed in our commonly owned copending patent application Ser. No. 848,729 filed Apr. 4, 1986.

BACKGROUND OF THE INVENTION

The invention relates to torque transmitting apparatus, and more particularly to improvements in apparatus for transmitting torque between the output element of the internal combustion engine and the input element of the change-speed transmission in a motor vehicle. Still more particularly, the invention relates to improvements in torque transmitting apparatus of the type wherein a slip friction clutch is installed between a set of flywheels one of which can be driven by the engine and the other of which can drive the change-speed transmission of a passenger car or another motor vehicle.

U.S. Pat. No. 4,274,524 to Nakane discloses a rotational torque transmission mechanism wherein the angular movements of one flywheel relative to another flywheel are opposed by a slip clutch and a damper in series with the slip clutch. The damper comprises a set of coil springs which operate in parallel with a friction generating device. Torque which is transmitted by the slip clutch greatly exceeds the maximum nominal torque which is generated by the internal combustion engine i.e., the slip clutch reacts only in response to highly pronounced fluctuations of torque.

The patented mechanism is capable of reducing the stress upon the power train between the engine and the wheels of the vehicle, and such mechanism is also capable of enhancing the comfort of the passenger or passengers and of effecting a certain reduction of noise. This is attributable to the ability of the mechanism to reduce shocks which often develop at low rotational speeds when the vehicle travels at a low speed, i.e., to the ability of the mechanism to allow for oscillation of the vehicle in the direction of travel. However, the patented mechanism fails to operate satisfactorily under numerous other circumstances which arise when a motor vehicle is in use, particularly within the full RPM range of the engine. The main reason is that, as mentioned above, torque which can be transmitted by the slip clutch of the mechanism of Nakane must considerably exceed the torque which is transmitted by the engine because the mechanism is designed to take into account tolerances in the making of discrete parts as well as that torque which is transmitted by the slip clutch is likely to vary under different operating conditions and on prolonged use of the vehicle. It has been found that the prestressing of the diaphragm spring which is used in the patented mechanism is likely to change with progressing wear upon the friction linings. Moreover, the coefficient of friction is likely to change within a wide range, for example, as a result of overheating and/or as a result of contact with a lubricant. The slip clutch transmits a substantial torque even when the engine operates in the lower RPM range, i.e., when the magnitude of engine torque is relatively low. This is particularly undesirable during starting or stoppage of the engine when the operation takes place at the critical frequency at which resonance is likely to develop. The result is extensive wear upon the parts and the development of undesirable noises.

OBJECTS AND SUMMARY OF THE INVENTION

An object of the invention is to provide an apparatus for transmitting torque between two flywheels in the power train between the engine and the changespeed transmission in a motor vehicle and to construct and assemble the apparatus in such a way that it operates satisfactorily during each and every stage of operation of the engine as well as under any and all circumstances of operation of the vehicle.

Another object of the invention is to provide the apparatus with at least one novel and improved slip clutch.

A further object of the invention is to provide an apparatus whose vibration damping characteristics are superior to those of heretofore known apparatus.

An additional object of the invention is to provide a simple, compact and inexpensive apparatus which exhibits the above-enumerated advantages and can be installed in existing types of motor vehicles.

Still another object of the invention is to provide a novel and improved method of damping torsional vibrations between relatively rotatable coaxial flywheels in the power train of a motor vehicle.

A further object of the invention is to provide novel and improved means for regulating the damping action of the apparatus in dependency on any one of a variety of different parameters.

Another object of the invention is to provide novel and improved flywheels which can be used in the above outlined apparatus.

A further object of the invention is to provide a novel and improved power train which embodies the above outlined apparatus and a motor vehicle which embodies the power train.

One feature of the invention resides in the provision of an apparatus which serves to transmit rotary motion between the output element (e.g., a crankshaft) of the internal combustion engine and the input element (e.g., a shaft) of the change-speed transmission in a motor vehicle. The apparatus comprises a plurality of coaxial flywheels including a first flywheel which is connectable to and serves to receive torque from the output element in the drive direction (i.e., when the engine drives the input element of the change-speed transmission), and a second flywheel which is coaxial with and is rotatable relative to the first flywheel and is connectable with the input element to rotate the latter in the drive direction (normally through the medium of a friction clutch) and to be rotated by the input element in the coast direction (e.g., while the vehicle is travelling downhill). The apparatus further comprises a slip clutch which is interposed between the first and second flywheels to transmit torque in either of the two directions, and means (e.g., including a diaphragm spring) for regulating the magnitude of such torque in at least one of the drive and coast directions.

The regulating means can comprise means for varying the magnitude of torque within a first range in the drive direction and within a different second range in the coast direction.

In accordance with a presently preferred embodiment of the invention, the regulating means comprises means for varying the magnitude of torque as a function of variations of at least one variable parameter, such as the extent to which one of the flywheels is angularly displaced relative to the other flywheel from a neutral position, the angular velocity of one of the flywheels, the extent to which the angular movement deviates from a constant angular movement, the acceleration, torque which is transmitted by the engine or by one of the flywheels, torque which is transmitted by one of the flywheels to the other flywheel or flywheels, the rotational speed, at least one parameter of the first flywheel, at least one parameter of the second flywheel, variations of at least one parameter of one of the flywheels with reference to variations of such one parameter of the other flywheel, and/or a combination of such variable parameters.

The apparatus can further comprise means for altering the extent of regulation of the magnitude of torque by the regulating means. Such altering means can comprise means for altering the extent of torque regulation as a function of time.

The slip clutch can comprise means for transmitting a predetermined (constant or variable) minimal torque and means for transmitting a variable torque which is superimposed upon the predetermined torque. The regulating means for the torque of such slip clutch can include means for varying the magnitude of variable torque as a function of variations of centrifugal force.

The regulating means can be designed to vary the magnitude of torque as a function of variations of centrifugal force up to a predetermined maximum magnitude or value. The slip clutch can be designed to transmit a predetermined torque which exceeds the nominal torque of the engine by between 5 and 50% (preferably by between 7 and 40%). The overall torque which can be transmitted by the slip clutch at the nominal torque of the engine can be selected in such a way that it is between 1.1 and 3.5 times the nominal torque.

The apparatus can further comprise damper means which is interposed between the first and second flywheels in such a way that it is located radially inwardly or radially outwardly of the slip clutch with reference to the common axis of the flywheels.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
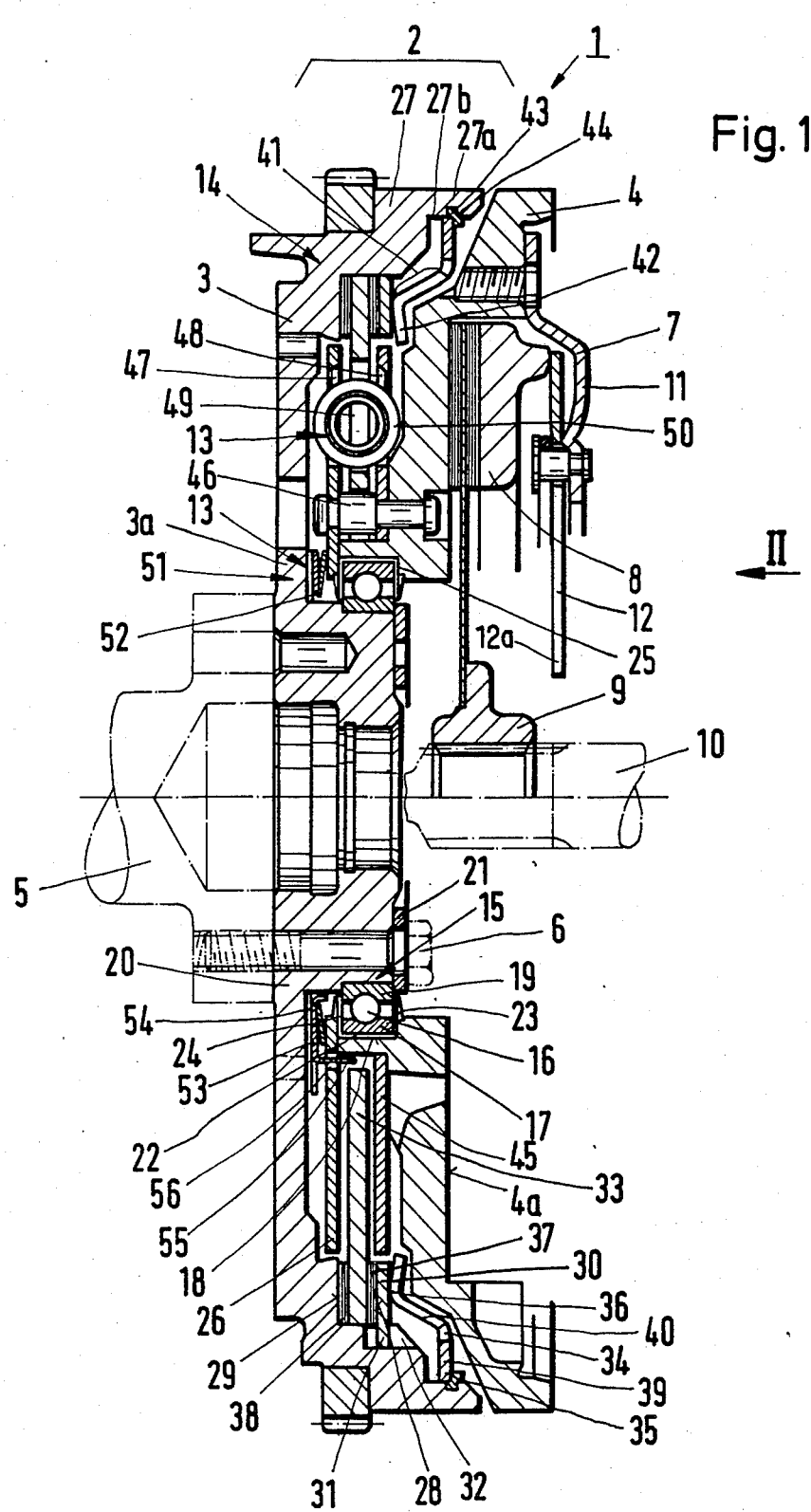
FIG. 1 is an axial sectional view of an apparatus which embodies one form of the invention.
Figure 2:
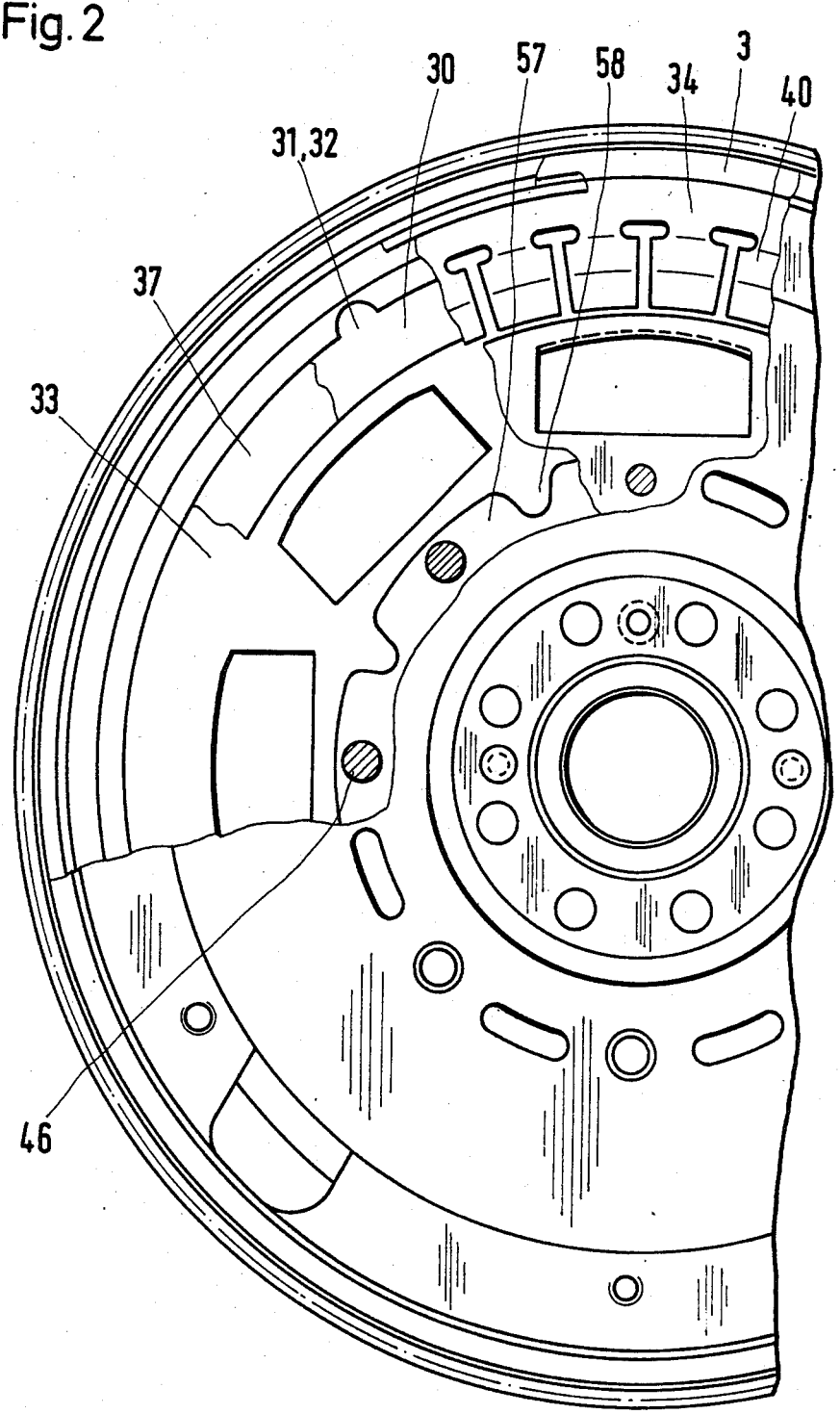
FIG. 2 is a fragmentary end elevational view as seen in the direction of arrow II in FIG. 1.

The apparatus 1 which is shown in FIGS. 1 and 2 serves to absorb variations of torque which is transmitted between the output element (crankshaft) 5 of the internal combustion engine and the input element (shaft) 10 of the change-speed transmission in a motor vehicle. The apparatus comprises a composite flywheel 2 including a first component or flywheel 3 which is separably affixed to the crankshaft 5 by a set of bolts 6 or similar fasteners, and a second component or flywheel 4 which is coaxial with the component 3 and can drive the shaft 10 through the medium of a friction clutch 7. The manner in which the clutch 7 is engageable or disengageable to effect or terminate the transmission of torque between the component 4 and the shaft 10 is well known and need not be described here. The illustrated friction clutch 7 comprises a housing or cover 11 which is non-rotatably secured (for example, bolted or riveted) to the component 4 and confines an axially movable pressure plate 8, a clutch plate or clutch disc 9, and a diaphragm spring 12. The clutch plate 8 is non-rotatably but axially movably secured to the cover 11 by a set of leaf springs (not shown) so that it can move axially toward and away from the adjacent lining of the clutch plate 9. The latter has a hub which is non-rotatably secured to the shaft 10 of the change-speed transmission. The other lining of the clutch plate 9 is adjacent to a friction surface 4a of the component 4. The marginal portion of the diaphragm spring 12 normally bears against the adjacent projections of the pressure plate 8 so that this plate bears against the adjacent lining of the clutch plate 9 and urges the other lining of the clutch plate into frictional engagement with the surface 4a of the component 4. In order to disengage the clutch 7, the inwardly extending prongs 12a of the diaphragm spring 12 are moved in the direction of the arrow II so as to enable the pressure plate 8 to move away from the surface 4a of the component 4 whereby the component 4 ceases to transmit torque to the clutch plate 9 and shaft 10.

The apparatus 1 further comprises a damping device or damper 13 which is interposed between the components 3 and 4 of the composite flywheel 2, and a slip friction clutch 14 (hereinafter called slip clutch) which enables the components 3 and 4 to turn relative to each other as soon as the slip torque is exceeded.

The component 3 has an axially extending protuberance 20 which is received with clearance in an axial bore or hole 18 of the component 4. The protuberance 20 is surrounded by bearing means 15 including a single antifriction ball bearing 16 having an inner race 19, an outer race 17 and a single annulus of spherical rolling elements between the two races. The outer race 17 is received in the bore 18 of the component 4, and the inner race 19 surrounds the adjacent portion of the peripheral surface of the protuberance 20. In accordance with a presently preferred embodiment of the invention, the inner race 19 is a press-fit on the protuberance 20 and is held against axial movement by a disc-shaped retainer 21 which abuts the end face of the protuberance 20 and is bolted or screwed to the component 3.

A heat barrier 22 is interposed between the outer race 17 of the bearing 16 and the component 4 so as to reduce the rate of heat transmission from the friction surface 4a to the bearing 16. The construction and advantages of such heat barrier are described in the aforeenumerated copending patent applications of the assignee. The illustrated heat barrier 22 comprises two rings 23, 24 having axially extending portions which surround the outer race 17 and radially extending portions which extend along the end faces of the races 17, 19 and bear against the respective end faces of the inner race 19 so as to confine the grease or other lubricant filling the space between the races around the rolling elements of the bearing 16. The ring 23 abuts an internal shoulder 25 of the component 4, and the ring 24 abuts a disc 26 which is non-rotatably secured to and is held at a fixed axial distance from the component 4 by a set of rivets 46 of or analogous distancing elements.

The radially outermost portion of the component 3 constitutes a relatively short sleeve 27 which surrounds the damper 13 as well as the slip clutch 14. As can be seen in FIG. 1, the slip clutch 14 is disposed radially outwardly of and surrounds the damper 13.

The slip clutch 14 has two axially spaced-apart annular friction surfaces 28, 29 which cannot rotate relative to the component 3 and serve to transmit to the slip clutch 14 torque which is generated by the internal combustion engine. In the embodiment of FIGS. 1 and 2, the friction surface 29 is provided directly on the component 3, and the friction surface 28 is provided on a pressure transmitting disc 30. The radially outermost portion of the disc 30 has radially extending projections in the form of teeth 31 which are received in complementary axially extending recesses or tooth spaces 31 provided in the component 3 and serving to ensure that the disc 30 and the component 3 will rotate as a unit. The tooth spaces 32 are provided in the internal surface of the sleeve 27 which, in the embodiment of FIGS. 1 and 2, is an integral part of the component 3. The tooth spaces 32 are elongated (as considered in the axial direction of the composite flywheel 2) so as to allow the disc 30 to move axially relative to the component 3 and vice versa. In other words, the disc 30 and its friction surface 28 are movable axially relative to the component 4 and hence relative to the friction surface 29 of the slip clutch 14.

An intermediate disc 33 is installed between the friction surfaces 28 and 29. The means for maintaining the two sides of the intermediate disc 33 in frictional engagement with the surfaces 28, 29 of the slip clutch 14 comprises a diaphragm spring 34 the radially outermost portion 39 of which abuts the sleeve 27 of the component 3 and whose radially innermost portion 36 bears against the disc 30 so as to urge the friction surface 28 toward the intermediate disc 33. Friction linings 37, 38 are provided at the opposite sides of the intermediate disc 33. The lining 37 is contacted by the friction surface 28, and the lining 38 is contacted by the friction surface 29. In accordance with one presently preferred embodiment of the invention, the friction linings 37 and 38 are non-rotatably secured to the radially outermost portions of the respective sides of the intermediate disc 33. However, if each of the linings 37, 38 constitutes a single annular piece of friction generating material, such friction linings can be rotatably inserted between the intermediate disc 33 and the disc 30 on the one hand and between the disc 33 and the surface 29 of the component 3 on the other hand. It is further possible to bond the lining 37 to the surface 28 and to bond the lining 38 to the surface 29; the function of the friction surface 29 is then taken over by one surface of the lining 37 and the function of the friction surface 29 is taken over by one surface of the lining 38. It will be seen that the linings 37, 38 can be secured to the intermediate disc 33, to the disc 30 and component 3, or can be loosely inserted at the opposite sides of the intermediate disc 33.

The diaphragm spring 34 is installed in prestressed condition and its circumferentially complete outer marginal portion 39 carries radially inwardly extending prongs or tongues 40 which define the radially innermost portion 36 and abut the disc 30. The tongues 40 are bent in a manner as can be seen in the upper and lower portions of FIG. 1 so that the outer marginal portion 39 is axially offset from the tips or radially innermost portions of the tongues 40. Each tongue 40 has a radially outermost portion 41 which slopes considerably toward the plane of the friction surface 28. The radially innermost portions 42 of the tongues 40 are nearly parallel to the plane of the friction surface 28 and are offset relative to the outer marginal portion 39, as considered in the axial direction of the components 3 and 4.

The sleeve 27 of the component 3 has a relatively thin free end portion 27a with an internal surface 27b which is formed with a groove 43 for a split ring 44 which serves as a means for holding the diaphragm spring 34 against axial movement in a direction away from the crankshaft 5. The configuration of the split ring 44 is such that it surrounds a portion of the periphery of the diaphragm spring 34 as well as a portion of the right-hand side of the radially outermost marginal portion 39. This ensures that the split ring 44 cannot be accidentally expelled or withdrawn from the groove 43 in the internal surface 27b of the end portion 27a of the sleeve 27.

The intermediate disc 33 constitutes the output element of the slip clutch 14 as well as the input element of the damper 13. It will be seen that the damper 13 is in series with the slip clutch 14. In the embodiment of FIGS. 1 and 2, the damper 13 comprises a pair of discs including the aforementioned disc 26 and a further disc 45. The discs 26 and 45 are disposed at the opposite sides of the intermediate disc 33 and are fixedly connected to each other by the aforementioned distancing elements 46 in the form of rivets which are anchored in the component 4.

The disc 33 and the discs 26, 45 at the opposite sides of the disc 33 are provided with openings in the form of windows 49, 47, 48 for energy storing elements in the form of coil springs 50. The springs 50 yieldably oppose angular displacements of the intermediate disc 33 relative to the discs 26, 45 and vice versa. The damper 13 of the apparatus 1 further comprises a friction generating device 51 which is installed between the components 3, 4 of the composite flywheel 2 and operates in parallel with the coil springs 50. The friction generating device 51 surrounds the protuberance 20 of the component 3 and is disposed axially between the disc 26 and the radially outwardly extending flange 3a of the component 3. It comprises a diaphragm spring 52 which reacts against the disc 26 and bears against a pressure-transmitting ring 53. A friction ring 54 is interposed axially between the pressure-transmitting ring 53 and the flange 3a of the component 3. The radially outermost portion of the pressure-transmitting ring 53 is formed with prongs or teeth 55 which extend axially through cutouts or tooth spaces 56 of the disc 26 so as to ensure that the ring 53 and the disc 26 cannot rotate relative to each other. If the friction generating device 51 is to generate a progressive (stepwise increasing or decreating) friction generating action, the tooth spaces 56 can be dimensioned in such a way that the teeth 55 are received therein with a certain freedom of angular movement, i.e., that the disc 26 and the pressure transmitting ring 53 can perform certain angular movements relative to each other.

As shown in FIG. 2, the distancing elements 46 extend axially through cutouts or recesses 57 which are provided in the internal surface of the intermediate disc 33. The recesses 57 alternate with radially inwardly extending projections or feet 58 which can constitute integral parts of the intermediate disc 33 and alternate with the distancing elements 46. The length of the recesses 57 determines the extent to which the damper 13 allows the components 3, 4 to turn relative to each other. Such means for limiting the extent of relative angular movement of the components 3, 4 is desirable and necessary if the torque which can be transmitted by the coil springs 50 of the damping device 13 is smaller than that torque at which the slip clutch 14 permits the components 3 and 4 to turn relative to each other. In other words, the shanks of the rivet-shaped distancing elements 46 will strike the adjacent teeth 58 only if the coil springs 50 are not fully compressed (so that each thereof constitutes a rigid block) earlier than at the instant of impingement of a distancing element 46 against the adjacent tooth 58 or vice versa.

The mode of operation of the apparatus 1 will be described with reference to the diagram of FIG. 3. The rotational speed of the internal combustion engine which includes or drives the crank shaft 5 is measured along the abscissa, and the moment or torque which is transmitted by the internal combustion engine is measured along the ordinate. Torque which can be transmitted by the slip clutch 14 is also measured along the ordinate.

When the internal combustion engine is idle, the slip clutch 14 can transmit a minimal or threshold torque 60 due to initial stressing of the marginal portion 39 of the diaphragm spring 34. The minimal torque 60 which can be transmitted by the slip clutch 14 is smaller than the nominal torque 61 of the internal combustion engine. Due to the axial offset between the portions 41, 42 of tongues 40 on the diaphragm spring 34 relative to the outer marginal portion 39, the portions 41, 42 of the tongues 40 tend to transmit to the marginal portion 39 a moment as a result of rotation of the internal combustion engine and the resulting development of centrifugal force. Such centrifugal force tends to urge the portions 41, 42 of the tongues 40 radially outwardly whereby such tongues act upon the marginal portion 39 of the diaphragm spring 34. However, since the tongues 40 bear against the disc 31 in the region 36, such moment is intercepted and the diaphragm spring 34 transmits to the disc 31 an axially oriented force whose magnitude increases with increasing rotational speed of the internal combustion engine in a manner as denoted by the parabolic curve 62 in the diagram of FIG. 3. The configuration of the tongues 40 on the diaphragm spring 34 is preferably such that the magnitude of torque 62 which is transmitted by the slip clutch 14 invariably exceeds the torque (see the curve 63 of FIG. 3) which is transmitted by the internal combustion engine within the entire RPM range of the engine.

It is desirable to design the slip clutch 14 in such a way that torque which is transmitted by the clutch 14 in the range below the idling RPM of the internal combustion engine (namely also in that range of RPM which comes into consideration only during starting and stoppage of the internal combustion engine and during which resonance can develop) is relatively small but does not fall below a value which still allows for starting of the internal combustion engine by towing the vehicle and which prevents the vehicle from starting to roll when the clutch is shifted into a forward or reverse gear. In that RPM range during which the internal combustion engine transmits the nominal torque 61, torque which can be transmitted by the slip clutch 14 should not be too large in order to ensure that the slip clutch will permit angular movements of the components 3, 4 relative to each other in response to abrupt shifting and will thus prevent an excessive stressing of the power train between the wheels and the engine as well as enhance the comfort of the occupants of the vehicle.

The torque which can be transmitted by the slip clutch while the engine is operated at the idling speed or above the idling speed should exceed the torque which is transmitted by the engine at a particular RPM, at least in the drive direction.

In order to compensate for manufacturing tolerances, for fluctuations of the friction coefficient as well as for wear upon the components of the slip clutch 14, especially upon the friction linings 37 and 38, it may be desirable to design the slip clutch in such a way that torque which can be transmitted thereby while the engine is idle exceeds the nominal torque 61 of the engine. Such progress of the torque which can be transmitted by the slip clutch 14 is indicated in FIG. 3 by the phantom-line curve 64. The minimum torque 65 which is transmittable by this slip clutch equals approximately 1.1 times the nominal torque 61 of the internal combustion engine. Such design of the slip clutch ensures that, even under the most adverse circumstances, torque which can be transmitted by the slip clutch progresses according to the curve 62 or is higher.

In order to enhance the force with which the tongues 40 of the diaphragm spring 34 bear upon the disc 30, it is possible to attach weights to some or all of the tongues 40 in a manner which is not shown in FIGS. 1 and 2. For example, discrete weights can be riveted to some or all of the tongues 40.

The slip clutch 14 of FIGS. 1 and 2 is capable of transmitting torque which is at least substantially the same regardless of whether the engine drives the wheels or the vehicle embodying the engine and the change-speed transmission is coasting.

Figure 4:
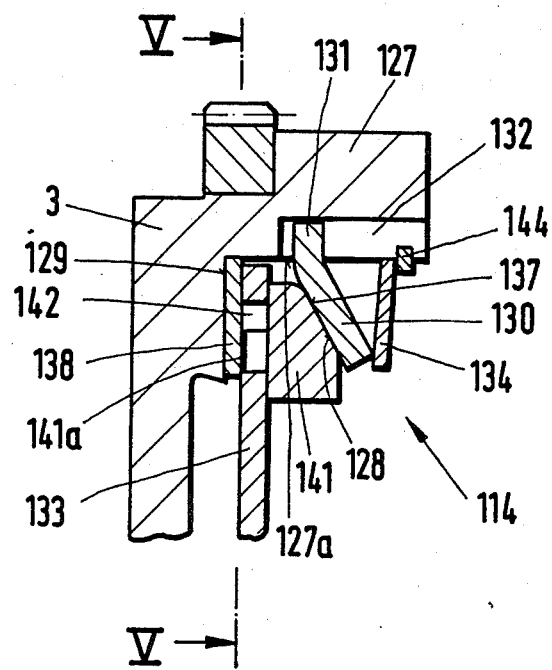
FIG. 4 is a fragmentary axial sectional view of a second apparatus wherein the slip clutch comprises flyweights.
Figure 5:
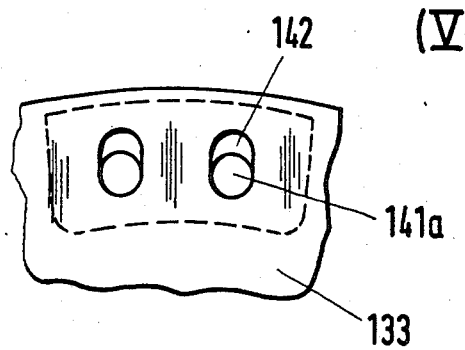
FIG. 5 is a fragmentary view as seen in the direction of arrow from the line V—V of FIG. 4.

FIGS. 4 and 5 show a modified slip clutch 114 having flyweights 141 which are acted upon by centrifugal force. The weights 141 are radially movably secured to and are guided by an intermediate disc 133 which corresponds to the disc 33 of FIG. 1. The mounting of weights 141 is such that they cannot move in the circumferential direction of the disc 133. To this end, the weights 141 comprise projections in the form of studs 141a which are received in radially extending slots 142 of the intermediate disc 133. The projections 141a extend substantially axially of the components 3 and 4 (only the component 3 is shown in FIG. 4). Each weight 141 tapers in the radial direction of the flywheels and has a sloping cam face 137 which has an arcuate shape, as considered in the circumferential direction of the disc 133. The curvature depends on the distance between the weights 141 and the common axis of the two components of the composite flywheel. The surfaces 137 abut the adjacent surface of a pressure transmitting disc 130. This disc has a surface 128 which is complementary to the surfaces 137 of the annulus of weights 141. The radially outermost portion of the disc 130 has radially outwardly extending projections in the form of teeth 131 received in axially parallel tooth spaces or recesses 132 provided in the internal surface 127a of the sleeve 127 of the component 3. This ensures that the disc 130 is compelled to share all angular movements of but is free to perform axial movements relative to the component 3.

A friction lining 138 is interposed between the friction surface 129 of the component 3 and the intermediate disc 133. A diaphragm spring 134 is provided to bias the intermediate disc 130 against the weights 141 and to thereby urge the weights 141 against the disc 133 which is held in frictional engagement with the adjacent surface of the lining 138 at the surface 129 of the component 3. The radially outermost portion of the diaphragm spring 134 reacts against a split ring 144 installed in an internal groove the sleeve 127. The radially innermost portion of the diaphragm spring 134 bears against the radially innermost portion of the pressure transmitting disc 130.

FIGS. 4 and 5 show the weights 141 in their radially innermost positions. These weights assume such positions when the internal combustion engine is idle and possibly also when the engine is operated at a low or very low RPM. At such time, the slip clutch 114 is designed to transmit a minimum of torque, namely the minimal torque of that range of torques which the slip clutch 114 is capable of transmitting.

As the RPM of the engine increases, the centrifugal force acting upon the weights 141 also increases so that the weights begin to creep or tend to creep radially outwardly, i.e., the projections 141a travel outwardly in the respective slots 142 of the disc 130. Due to frustoconical shape of the surfaces 128, 137, the disc 130 urges the radially outwardly moving weights 141 axially toward the flange of the component 3 and causes the intermediate disc 133 to bear with a greater force against the friction lining 138. The weights 141 can begin to move radially outwardly as soon as the force which the radially innermost portion of the disc 130 transmits in a direction to the right, as viewed in FIG. 4, exceeds the force with which the diaphragm spring 134 opposes axial displacement of the adjacent portion of the disc 130. The teeth 131 of the disc 130 then travel in the respective tooth spaces 132 in a direction toward the split ring 144 and the weights 141 continue to move radially outwardly to increase the force with which the intermediate disc 133 is urged against the lining 138. The rate at which the weights 141 can travel radially outwardly, namely the rate at which the torque that can be transmitted by the slip clutch 114 increases, depends on the characteristics of the diaphragm spring 134, i.e., upon the rate at which the radially innermost portion of the spring 134 yields to the axially oriented forces which are transmitted thereto by the disc 130 in response to increasing centrifugal force acting upon the weights 141 (i.e., in response to increasing RPM of the engine). It will be seen that the design (characteristic curve) of the diaphragm spring 134 determines the rate at which the ability of the slip clutch 114 to transmit torque increases with increasing rotational speed of the crankshaft 5 (not shown in FIGS. 4 and 5).

When the RPM of the internal combustion engine reaches a certain value, the weights 141 reach their outermost positions which are determined by the length of the slots 142 in the disc 130. At such time, the radially outermost portions of the weights 141 can reach and abut a blocking means constituted by the internal surface 127a of the sleeve 127 on the component 3. Consequently, the torque which is transmitted by the slip clutch 114 does not increase in response to a further increase of rotational speed of the engine. This will be readily appreciated since the centrifugal force cannot cause any further radial movement of the weights 141 away from the common axis of the components 3, 4 so that the force with which the disc 133 bears against the lining 138 remains unchanged. The diaphragm spring 134 can be designed in such a way that its stressing by the flywheels 141 entails an increase of the slip moment of the slip clutch 114.

In order to ensure that the weights 141 will readily move radially of the flywheel in response to changes in RPM of the engine, namely that the radial movability of the weights 141 is not dependent on uncontrollable variations of friction but solely or primarily upon the characteristic curve of the diaphragm spring 134, it is possible to install antifriction rolling elements (e.g., rollers, spheres, needles or the like) between the surfaces 128 and 137 so that the radial positions of the weights 141 are determined primarily by two parameters, namely the RPM of the engine and the characteristic curve of the diaphragm spring 134. This enables the slip clutch 114 to more readily conform its torque-transmitting characteristics to the characteristics of the diaphragm spring 134. The arrangement is preferably such that the friction between the weights 141 and the disc 130 is very small or even approaches zero.

It is further possible to reduce the friction between the disc 130 and the weights 141 by utilizing a friction bearing instead of rolling elements. A layer of friction reducing material can be installed between the disc 133 and the weights 141. Such layer can contain or consist of polytetrafluorethylene. For example, the layer can be applied to the left-hand sides of the weights 141 as viewed in FIG. 4. Other types of friction reducing material can be used with similar or equal advantage.

It is also possible to replace the friction lining 138 with a second set of weights analogous to the weights 141. The friction surface 129 and the adjacent surfaces of the additional flyweights are then of frustoconical shape; they may be substantially mirror symmetrical to the surfaces 128 and 137 with reference to the plane of the disc 133. The weights of the two sets of weights at the opposite sides of the disc 133 can coupled to each other in such a way that each weight at one side is coupled to a weight at the other side of the disc 133. This renders it possible to reduce or eliminate friction between the weights and the respective surfaces of the disc 133. All that is necessary to make the bridges which connect the left-hand weights with the right-hand weights sufficiently rigid and strong to ensure that the weights of a pair of interconnected weights cannot move nearer to each other or that they remain at a distance which at least matches the thickness of the respective portion of the disc 133. This enhances the radial movability of the just discussed pairs of weights and ensures that the operation of the slip clutch 114 is more predictable, namely that the slip clutch more predictably responds to changes in centrifugal force and/or the bias of the diaphragm spring 134.

Figure 6:
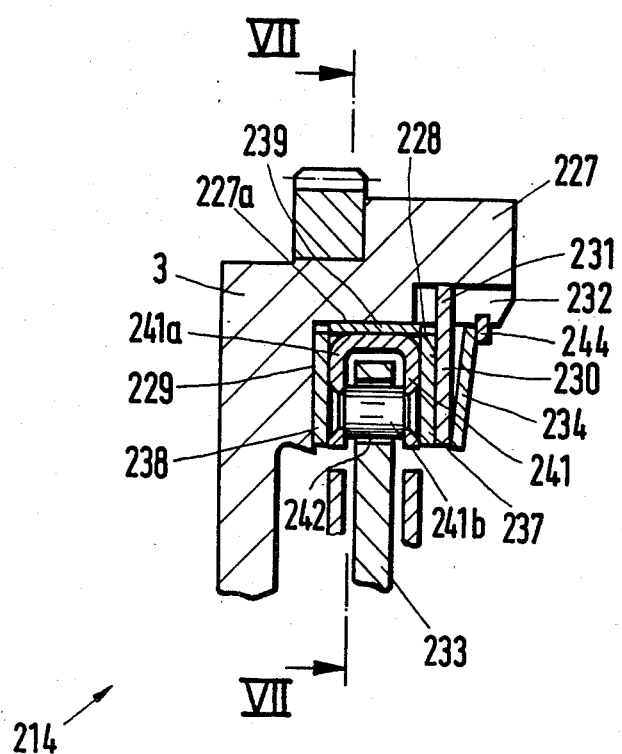
FIG. 6 is a fragmentary axial sectional view of a third apparatus.
Figure 7:
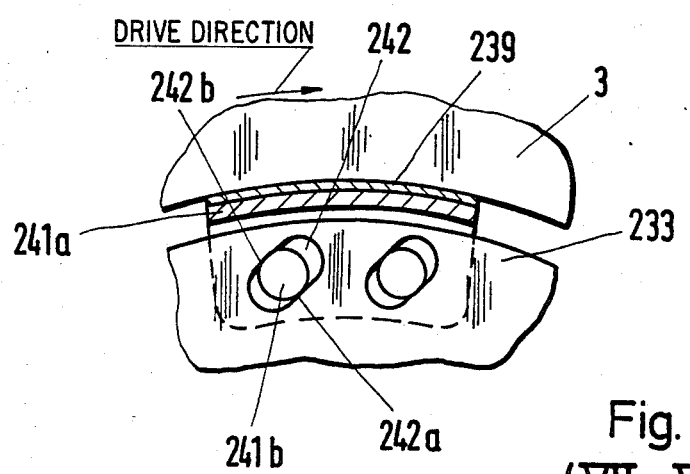
FIG. 7 is a view as seen in the direction of arrows from the line XII—XII of FIG. 6.

FIGS. 6 and 7 illustrate a modified slip clutch 214 which also employs an annulus of flyweights 241 in the form of friction shoes. Each of the friction shoes (hereinafter weights) 241 has a substantially U-shaped carrier portion 241a which extends around the periphery of the adjacent portion of the intermediate disc 233. The bridge or web of each U-shaped carrier portion 241a is provided with an external friction lining 239, the outer side of one leg of the portion 241a carries a friction lining 237, and the outer side of the other leg of the portion 241a carries a friction lining 238. The projections or studs 241b which extend through the elongated slots 242 of the disc 233 constitute distancing elements which maintain the two legs of the respective U-shaped portion 241a at a fixed distance from each other; such distance exceeds the thickness of the disc 233 between the two legs. The configuration and inclination of the slots 242 is such that the weights 241 can perform a composite movement having a component in the radial direction and a component in the circumferential direction of the disc 233. When the engine of the motor vehicle is driven, the linings 239 of the weights 241 abut the internal surface 227a of the sleeve 227 on the component 3. Each weight 241 is disposed between the friction surface 229 of the component 3 and the friction surface 228 of the disc 230. The axial force is supplied by the diaphragm spring 234 whose radially outermost portion reacts against a split ring 244 which is anchored in the sleeve 227 and whose radially innermost portion bears against the radially innermost portion of the disc 230. The split ring 244 can be more or less permanently anchored in the sleeve 227. The radially outwardly extending projections or teeth 231 of the disc 230 are guided in the corresponding tooth spaces or recesses 232 of the sleeve 227 in the same way as described in connection with FIG. 4.

The magnitude of centrifugal force acting upon the weights 241 increases in response to increasing RPM of the engine. The rate at which the torque which is transmitted by the slip clutch 214 changes in response to changing RPM of the engine can be influenced by appropriate configuration of the slots 242, namely of the configuration of surfaces which bound such slots and are contacted by the median portions of the respective studs 241b.

As mentioned above, the magnitude of torque which is transmitted by the slip clutch 114 of FIGS. 4 and 5 remains unaffected by the direction in which the relatively movable parts of the slip clutch turn with reference to each other. Thus, the magnitude of such torque will be the same if the crankshaft 5 is driven in a clockwise or in a counterclockwise direction, as long as the magnitude of the centrifugal force acting upon the weights 141 remains the same. The slip clutch 214 of FIGS. 6 and 7 differs from the slip clutch 114 in that the rate at which the torque changes in response to changes in the RPM of the engine (and hence in the magnitude of centrifugal force) while the parts of the slip clutch rotate in one direction is not the same as the magnitude of such torque when the rotary parts are driven in the opposite direction. This is due to the inclination of the surfaces 242a, 242b in the slots 242 of the disc 233. The inclination of the slots 242 with reference to a radial direction can be selected in such a way that, when the engine drives the input element 10 (not shown in FIGS. 6 and 7) of the change-speed transmission, namely when the wheels are driven by the engine (note the arrow and the legend "DRIVE DIRECTION" in FIG. 7), the peripheral surfaces of intermediate portions of the studs 241b cooperate with the internal surfaces 242a in the respective slots 242. The inclination of the surfaces 242a (each of which can be said to constitute a cam face or a ramp) is such that the magnitude of torque which is transmitted by the slip clutch 214 increases. This is attributable to the fact that the internal surfaces 242a push the respective projections 241b radially outwardly.

When the vehicle is coasting, namely when the wheels tend to transmit torque to the crankshaft 5 of the engine, the projections 241b cooperate with the outer surfaces 242b in the respective slots 242. The inclination of surfaces 242b can be readily selected in such a way that the magnitude of torque which is then transmitted by the slip clutch 214 is reduced (as compared with the magnitude of torque which would have been transmitted at the same RPM were the engine in the process of driving the input shaft 10 of the transmission). At such time, the surfaces 242b push the studs 241b radially inwardly to thus reduce the magnitude of torque which is generated by the slip clutch 214 for a predetermined value of centrifugal force then acting upon the weights 241.

Figure 8:
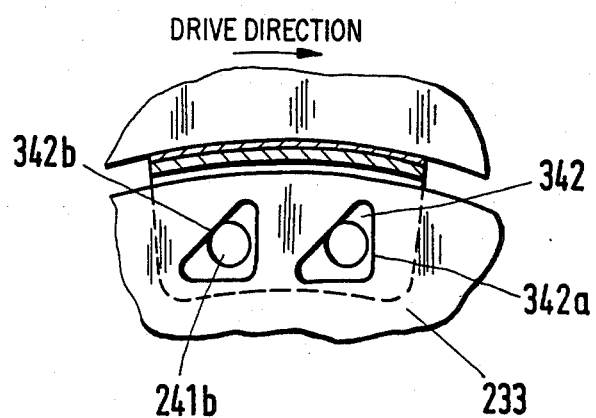
FIG. 8 is a view similar to that of FIG. 7 but showing a portion of a modified slip clutch.

FIG. 8 shows a further modification of the slip clutch 114. The intermediate disc 233 is formed with substantially triangular slots 342 each bounded by a first surface 342a which extends substantially radially of the disc 233, a second surface (unnumbered) which extends substantially tangentially of the disc 233 and a third surface 342b which slopes in a direction radially and circumferentially of the disc 233. The flyweight of FIG. 8 is assumed to be the same as the weight 241 which is shown in FIGS. 6 and 7. When the engine drives the input shaft of the transmission, the studs 241b of the weights abut and slide along the radially extending surfaces 342a in the respective slots 342. This ensures that the projections 241b cannot influence the magnitude of torque which is transmitted by the slip clutch embodying the structure of FIG. 8. During coasting, the studs 241b cooperate with the sloping surfaces 242b in the respective slots 342. At such time, the magnitude of torque which can be transmitted by the slip clutch is smaller than that torque which can be transmitted by the slip clutch at the same RPM of the engine during normal operation of the vehicle, namely when the engine drives the input shaft of the transmission. The surfaces 342b push the corresponding studs 241b radially inwardly which entails a corresponding movement of the weights. It will be seen that the magnitude of torque which is transmitted by the slip clutch of FIG. 8 during one mode of operation (in the coast direction) can be varied whereas the magnitude of torque which is transmitted while the engine drives the input shaft of the transmission (drive direction) varies only as a function of the RPM of the engine and the characteristic curve of the diaphragm spring which is used to urge the disc 233 toward the first component (not shown in FIG. 8).

Figure 9:
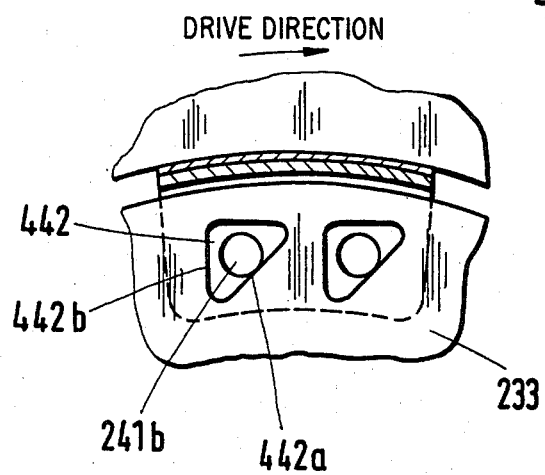
FIG. 9 is a view similar to that of FIG. 8 but showing a portion of an additional slip clutch.

FIG. 9 illustrates a modification of the slip clutch which embodies the structure of FIG. 8. The configuration of the slots 442 in the intermediate disc 233 is altered so that the projections or studs 241b slide along the radially and circumferentially extending surface 442a while the engine drives the flywheel or component 3 and along the radially extending surfaces 442b while the vehicle is coasting. This means that the magnitude of torque during normal operation of the engine (drive direction) will vary as a function of the RPM of the engine, as a function of the characteristic curve of the diaphragm spring 234 (not shown in FIG. 9) and as a function of the slope of the surfaces 442a in the slots 442. When the vehicle is coasting, the studs 241b contact the radially extending surfaces 442b in the respective recesses and, therefore, the configuration of surfaces bounding the slots 442 of FIG. 9 cannot influence the magnitude of torque which is transmitted by the slip clutch during operation in the coast direction. Torque which is transmitted by the slip clutch is then influenced only by the RPM of the engine (i.e., by the centrifugal force acting upon the weights 241) and by the parameters of the diaphragm spring 234.

It will be readily appreciated that the configuration of surfaces bounding the slots in the disc 233 can be selected in such a way that the surfaces can influence the magnitude of torque not only while the vehicle is coasting but also while the engine drives the input shaft of the change-speed transmission, or vice versa. The arrangement may be such that the magnitude of torque which is transmitted during coasting is reduced in response to travel of the studs 241b along the respective surfaces in the corresponding slots of the disc 233 and that the magnitude of torque which is transmitted by the slip clutch is also influenced by the surfaces bounding the respective portions of the slots while the vehicle is coasting.

In accordance with a further modification, which is not specifically shown in the drawing, the elongated radially extending recesses or slots 142 of the slip clutch 114 shown in FIGS. 4 and 5 can be altered so that they resemble the slots 242 of FIG. 7, the slots 342 of FIG. 8 or the slots 442 of FIG. 9. The surfaces bounding such modified recesses then cooperate with the studs 141a of the respective weights 141 in a manner as described in connection with FIGS. 6-7, 8 and 9. By the same token, the weights 141 of FIG. 4 can be replaced with weights 241 of the type shown in FIGS. 6-7, 8 and 9.

In the slip clutch 214 of FIGS. 6 and 7, the weights 241 are clamped between the disc 230 and the friction surface 229 so as to generate a minimum or threshold torque, and an additional torque is superimposed upon such minimum torque when the engine is running. Such additional torque is generated due to the development of centrifugal force as soon as the engine is started. As explained above, centrifugal force acting upon the weights 241 tends to wedge such weights between the sleeve 227 of the component 6, the component 3 (friction surface 229) and the disc 230. The major part of additional torque is generated as a result of frictional engagement between the radially outermost lining 239 (FIG. 6) and the internal surface 227a of the sleeve 227.

It is further within the purview of the invention to modify the inclination of surfaces which bound the slots in the intermediate disc 133 or 233 in such a way that a self-locking action develops when the disc 133 or 233 rotates in one direction or in each of the two directions. The slip clutch then acts not unlike a locking device or a brake, namely the components 3, 4 are then free to turn relative to each other only through the angle which is determined by the damper 13. As soon as such angle is reached, the components 3 and 4 are compelled to rotate in the respective direction as a unit. Additional variations in the rate at which the torque changes while the centrifugal force acting upon the weights changes can be achieved by appropriate configuration of surfaces bounding the slots 142, 242, 342 or 442 of the intermediate disc 133 or 233. This renders it possible to achieve any desired practical curve denoting the change of torque which is transmitted by the slip clutch while the vehicle is operated in the drive direction (the engine drives the input shaft of the transmission) or while the vehicle is coasting. Thus, the designer of the apparatus can select that progress of torque transmission which is best suited for a particular use, e.g., in a passenger car, in a truck, in a van or in another motor vehicle.

Figure 10:
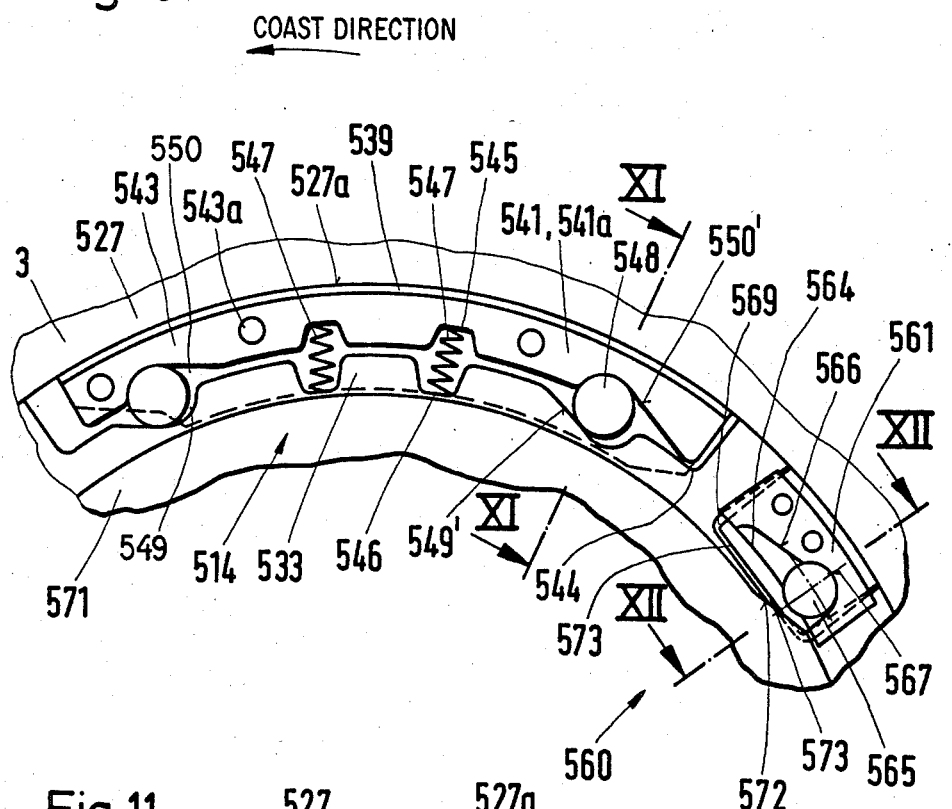
FIG. 10 is a fragmentary end elevational view of an apparatus which employs two slip clutches.
Figure 11:
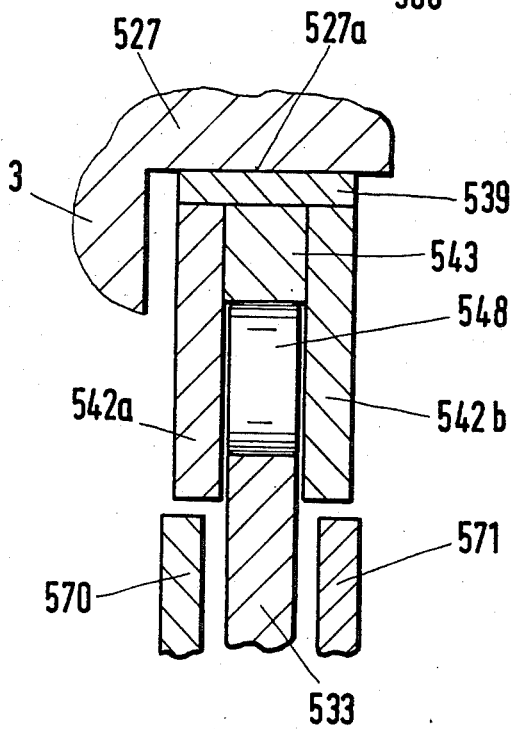
FIG. 11 is an enlarged sectional view as seen in the direction of arrows from the line XI—XI of FIG. 10.
Figure 12:
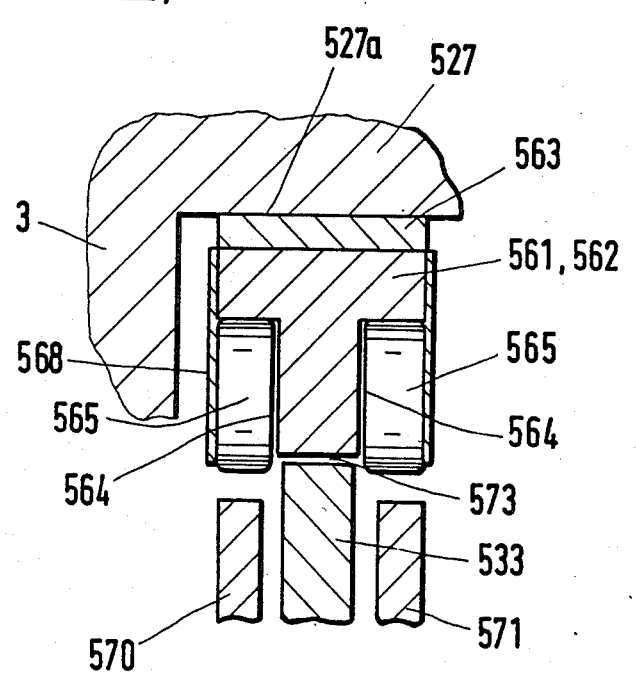
FIG. 12 is a similar sectional view as seen in the direction of arrows from the line XII—XII of FIG. 10.

FIGS. 10 to 12 illustrate a further apparatus which is installed in a composite flywheel including the component 3 and a second component 4 (not specifically shown in FIGS. 10 to 12). The intermediate disc 533 corresponds to the disc 33 of FIG. 1. A first slip clutch 514 hich includes flyweights 541 is installed between the component 3 and the disc 533. The construction of the slip clutch 514 is such that its weights 541 act as blocking or locking means in the drive direction, i.e., when the engine drives the input shaft of the transmission. The apparatus of FIGS. 10 to 12 further comprises a second slip clutch 560 which becomes active between the components 3 and 4 when the engine is idle. The slip clutch 560 acts as a barrier in a direction in which the components 3 and 4 of the composite friction clutch would rotate during coasting of the vehicle.

Each weight 541 can be said to constitute a brake shoe and includes a carrier 541a whose circumferentially extending bridge 543 is provided with a friction lining 539 which can abut the internal surface 527a of the sleeve-like extension 527 of the component 3. Each weight 541 comprises three sections, namely two lateral sections or legs 542a, 542b which are disposed at the opposite sides of the disc 533 and extend radially outwardly beyond the projections or teeth 548 of such disc, and the aforementioned (centrally located) section or bridge 543 which is disposed radially outwardly of the disc 533 between the radially outermost portions of the legs 542a, 542b. The sections 542a, 542b and 543 of each composite weight 541 of the slip clutch 514 are rigidly connected to each other by distancing elements 543a in the form of rivets or the like. The weights 541 are installed in recesses 544 which are machined into or otherwise formed in the periphery of the disc 533. The radially outermost portion of the disc 533 holds the weights 541 against undue axial movement relative thereto (see FIG. 11) and with reference to the components 3, 4 of the composite flywheel.

The central section 543 of each weight 541 is provided with a radially outwardly extending cutout or recess 545 which is adjacent to a radially inwardly extending cutout or recess 546 in the disc 533. As can be seen in FIG. 10, each of the recesses 545 is in at least partial communication with the adjacent recess 546, and such composite recesses receive coil springs 547 which tend to urge the respective weights 541 radially outwardly so that the friction linings 539 on the sections 543 of such weights bear against the internal surface 527a of the sleeve 527 on the component 3. The coil springs 547 store sufficient energy to ensure that the slip clutch 514 can transmit a certain minimal or threshold torque when the internal combustion engine is idle.

The slip clutch 514 further comprises rolling elements 548 (for example, cylindrical rollers) which are confined in composite recesses or cutouts 549, 550 defined by the disc 533 and the respective weights 541. Each recess 549 is bounded in part by a first cam face or ramp 549' which extends radially and circumferentially of the disc 533. A second ramp (which is substantially a mirror image of the first ramp 549' but is shifted with respect thereto in the circumferential direction of the disc 533) is denoted by the reference character 550'. The ramps 549' are provided on the disc 533, and the ramps 550' are provided on the respective weights 541. The arrangement is such that each ramp 549' is at least substantially parallel to the corresponding ramp 550'. The inclination of the ramps 549', 550' relative to a plane extending exactly radially of the disc 533 is such that the magnitude of torque which is generated by the slip clutch 514 while the engine rotates the input shaft of the transmission increases. In the embodiment of FIGS. 10–12, the inclination of the ramps 549', 550' is such that the magnitude of torque which can be transmitted by the weights 541 in the drive direction (in which the engine drives the input shaft of the transmission) is invariably greater than the torque between the components 3 and 4. Consequently, the slip clutch 514 acts as a locking or blocking device under normal operating conditions, i.e., when the engine drives the transmission. In other words, the disc 533 and the component 3 are then practically rigidly coupled to each other for rotation in a direction corresponding to that in which the composite flywheel is driven while the engine rotates the input shaft of the transmission. However, such blocking or locking action is terminated when the vehicle is coasting, namely when the input shaft 10 tends to drive the crankshaft 5. At such time, the disc 533 rotates the component 3 and hence also the crankshaft 5 of the engine. The rolling elements 548 then do not tend to move the adjacent cam faces or ramps 549', 550' apart so that only a limited torque can be transmitted during coasting. Such limited torque is composed of the minimum torque which is generated by the springs 547 and under the action of centrifugal force upon the weights 541. In order to ensure satisfactory operation of the slip clutch 514 (i.e., as a means for blocking rotation of the disc 533 relative to the component 3 when the engine drives the input shaft 10 of the change-speed transmission), the recesses 544 are longer (in the circumferential direction of the disc 533) than the weights 541 so that the assembly of weights 541 can perform a certain (relatively small) angular movement relative to the disc 533.

The second slip clutch 560 operates in parallel with the slip clutch 514 and comprises flyweights 561 which simultaneously perform the function of brake shoes. Each weight 561 comprises a carrier 562 whose radially outermost portion or bridge 562 carries a friction lining 563 which can be caused to bear upon the internal surface 527a of the sleeve 527 of the component 3. The lateral surfaces of the weights 561 are formed with cutouts or recesses 564 for rolling elements 565 in the form of short cylinders. The surfaces bounding the recesses 564 provide tracks for the rolling elements 565. In order to ensure that the rolling elements 565 will remain in the corresponding recesses 564, each weight 561 carries a sheet metal skirt 568 which extends radially inwardly and overlies the exposed sides of the respective rolling elements 565. The weights 561 are installed in recesses or cutouts 569 which are provided in the radially outermost portions of the intermediate disc 533. The configuration and dimensions of the cutouts 569 are selected in such a way that the weights 561 have sufficient freedom of movement to ensure that the slip clutch 560 will operate properly, and more particularly that the weights 561 will have sufficient freedom of movement radially and circumferentially of the intermediate disc 533.

The apparatus of FIGS. 10–12 further comprises two discs 570, 571 which correspond to the discs 26, 45 of the embodiment of FIG. 1 and can be secured to the second component 4 (not shown in FIGS. 10–12) in the same way as described for the discs 26, 45. The radially outermost portions of the discs 570, 571 have ramps or cam faces 572 which can cooperate with the rollers 565 in a manner to be described in detail hereinafter. The ramps 572 of the discs 570, 571 are at least substantially parallel to ramps 566 which are provided on the weights 561. As can be seen in FIG. 10, the inclination of the ramps 566, 572 is counter to the direction of inclination of the ramps 549', 550'. Consequently, the torque magnifying action of the slip clutch 560 is counter to the direction of the torque magnifying action of the slip clutch 514.

The slip clutch 560 is shown in a position which it assumes when the engine drives the crankshaft. At such time, the slip clutch 560 can transmit a torque which is proportional to the magnitude of centrifugal force acting upon the weights 561. The centrifugal force also acts upon the rollers 565 which then bear against the radially extending surfaces 567 bounding the respective recesses 564. The torque which is then transmitted by the slip clutch 560 is added to the torque which can be transmitted by the slip clutch 514.

The slip clutch 560 preferably comprises several weights 561 which are spaced apart from each other in the circumferential direction of the disc 533. This ensures that, when the engine is idle and the weights 561 assume predetermined angular positions with reference to the intermediate disc 533, the rollers 565 can move radially inwardly so as to come to rest on the ramps 572. As can be seen in FIG. 10, the surfaces at the bottoms of the recesses 569 are closely adjacent to the carriers 562 of the respective weights 561. The relatively small clearances between such parts are denoted by the reference characters 573. Such construction ensures that the radial positions of the weights 561 change very little when the engine is idle. The distance between the ramps 566, 572 suffices to ensure that the rollers 565 can be wedged between such ramps in response to the necessary angular displacement of the components 3 and 4 of the composite flywheel relative to each other. Consequently, the weights 561 can bear radially against the internal surface 527a of the sleeve 527 of the component 3 and transmit torque from the intermediate disc 533 to the component 3.

The inclination of the ramps 566, 572 is selected in such a way that torque which can be transmitted by the slip clutch 560 suffices to ensure that the slip clutch 560 acts as a barrier or lock for parking of the vehicle. In other words, even if the vehicle is parked on a slope, it is not permitted to roll forwardly or rearwardly because such rolling movement is prevented by the slip clutch 560. Moreover, the slip clutch 560 renders it possible to start the vehicle by pushing it since it acts as a barrier or lock up to a predetermined RPM.

The apparatus of FIGS. 10-12 can be modified by combining the slip clutches 514 and 560. For example, one of these slip clutches can be integrated into the other slip clutch. Furthermore, it is possible to design the clip clutches 514 and 560 in such a way that the magnitude of torque which can be transmitted thereby while the vehicle is at a standstill is close to zero and reaches a value of between 50 and 100 Nm at the time when the engine is running at the idling RPM.

In order to ensure that the vehicle cannot roll away when it is at a standstill and that such movements of the vehicle are prevented by the change-speed transmission, as well as to allow an operator to start the engine merely by pushing the vehicle, the slip clutch 560 can be replaced with a locking device which acts between the components 3 and 4 and becomes active in response to turning off of the internal combustion engine, namely when the idling RPM is reduced to zero. Such locking device can be designed to be ineffective as long as the RPM of the crankshaft 5 exceeds a certain minimal value which is preferably less than the idling RPM of the engine. The arrangement is such that the locking device remains active during starting of the engine until the RPM reaches a predetermined value which is or can be below the idling RPM. The locking device is then deactivated in automatic response to an increase of the RPM of the engine and remains inactive while the engine is running.

The improved apparatus is susceptible of many additional modifications. Thus, the power train between the output element of the engine and the input element of the change-speed transmission can comprise one or more slip clutches which are effective at all times but the magnitude of torque which can be transmitted thereby can be altered in a number of ways and in response to changes in one or more predetermined operating parameters, at least in one direction of rotation of components of the flywheel. The modifications can involve changing the torque in accordance with a first pattern during normal operation of the engine and in accordance with a different second pattern while the vehicle is coasting, and such changes can be effected gradually or stepwise. Furthermore, the rate at which the torque changes in one direction can be identical with the rate at which the torque changes in the opposite direction, and it is equally possible to effect a combination of these changes in a single power train. The arrangement may be such that changes which are effected by one of the slip clutches can be identical or similar to those which are effected by the otherslip clutch or clip clutches, or that each slip clutch changes the rate of torque transmission (during normal operation and/or during coasting) independently of each other slip clutch. In other words, two or more slip clutches can operate in parallel or in series.

The parameters which determine the manner in which the regulating means of the apparatus varies the magnitude of torque transmitted by the slip clutch or slip clutches (particularly the angular velocity, the irregularity of angular movement as well as the acceleration) can involve absolute values (for the entire apparatus) or relative values (i.e., the relationship of one or more parameters of one of the flywheels to one or more parameters of the other flywheel). In other words, the angular velocity, the non-uniformity of angular movement and the acceleration of one of the flywheels relative to the other flywheel can be used as parameters which determine the manner of varying the torque of the slip clutch or slip clutches by the regulating means (such as the diaphragm spring 34) of the improved apparatus.

Similar observations apply for the parameter "torque". The torque of a slip clutch can be regulated in dependency on (absolute) torque which is transmitted by the engine or (relative) torque which is transmitted from one of the flywheels 3, 4 to the other flywheel. It is often desirable to change the torque of the slip clutch in dependency on variations of torque between the two flywheels and/or in dependency on the RPM. Two or more parameters can be considered jointly in regulating the torque of the slip clutch(es).

Figure 3:
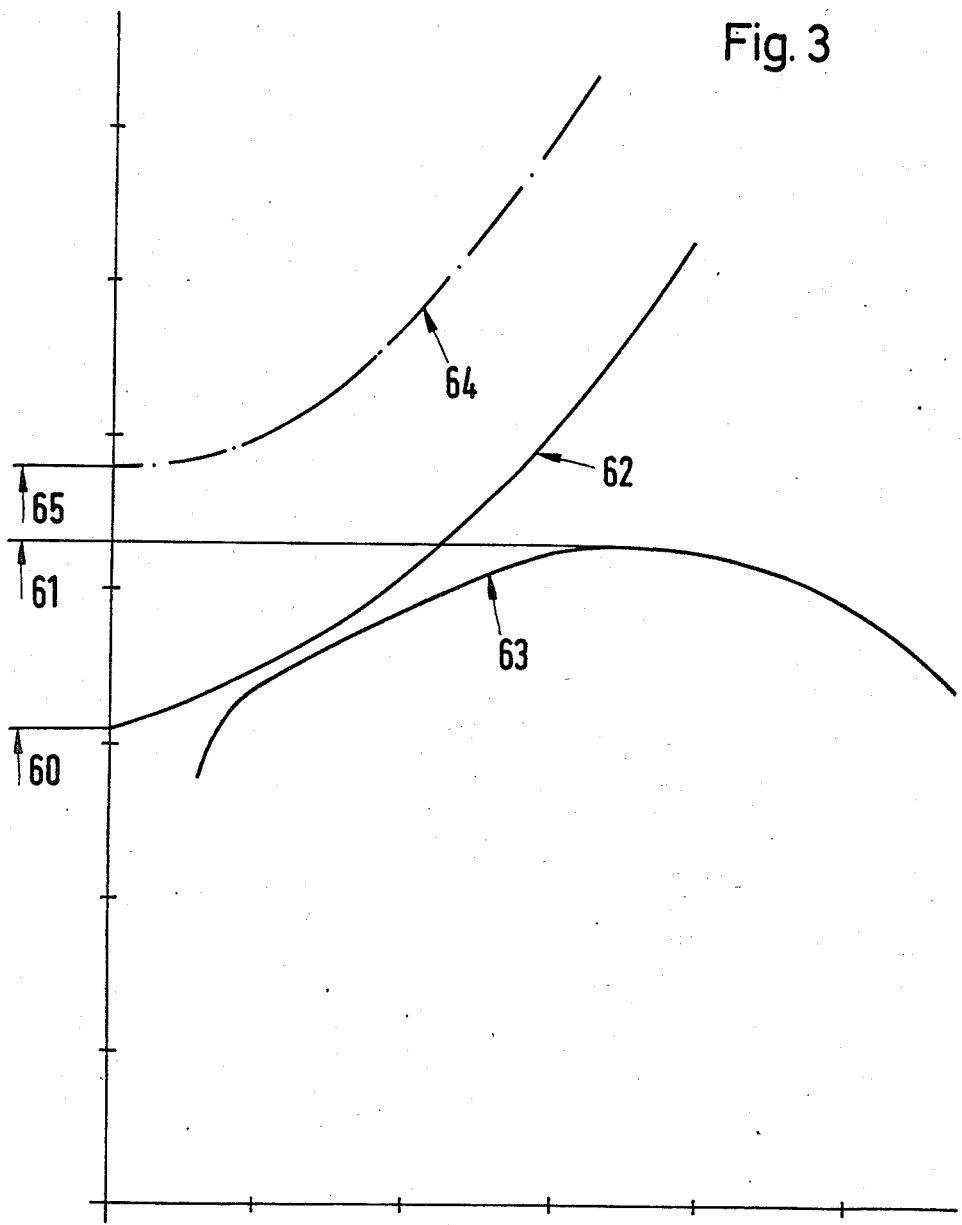
FIG. 3 is a diagram wherein the rotational speed of the engine is measured along the abscissa and torque which is transmitted by the engine as well as torque which is transmitted by the slip clutch of FIGS. 1 and 2 is measured along the ordinate.

The slip clutch of FIGS. 1 to 3 can be replaced with several discrete slip clutches one of which is designed to transmit the predetermined minimal torque and the other of which is regulatable to transmit torque whose magnitude is variable as a function of one or more variable parameters. The slip clutch 114 of FIGS. 4-5 exhibits the advantage that the surface 127a can limit the extent to which the magnitude of torque of the slip clutch 114 can be increased in response to increasing rotational speed and centrifugal force. It is often desirable to select the minimal torque in such a way that it exceeds the nominal torque of the engine by 5–50%, preferably by 7–40%.

Under certain other circumstances, the minimal torque of the slip clutch can be at least slightly below the nominal torque of the engine, especially in the RPM range below the idling RPM (i.e., in the range which normally comes into consideration only during starting or during turning off of the engine). Since the modern drive systems of motor vehicles are designed in such a way that their critical basic frequency and the critical RPM (which entails the development of resonance) are below the ignition cycle frequency of the lowermost possible RPM which can be maintained during operation of the engine (i.e., also of the idling RPM), the aforementioned design of the slip clutch enables the apparatus to transmit a relatively small torque while the operation takes place at the critical RPM. This is desirable because it results in a suppression of amplification of vibrations with attendant reduction of stresses upon the power train and pronounced suppression of noise.

The nominal torque of an internal combustion engine is the maximum torque referred to by the manufacturer. Proper operation of the apparatus is ensured if the torque which can be transmitted by the slip clutch is between 1.1 and 3.5 times the nominal torque. As a rule, torque which can be transmitted by the slip clutch should only slightly exceed the torque which is momentarily transmitted by the engine (this applies for the full RPM range of the engine); however, and in order to take into consideration the aforementioned manufacturing tolerances and the wear upon the parts, slip torque can be selected with a view to considerably exceed that torque which is transmitted by the engine. When the RPM equals or exceeds that at which the engine transmits the nominal torque, the fact that the slip torque considerably exceeds the engine torque is of no consequence under many operating conditions because, at such time, fluctuations of RPM and/or torque can be compensated for by the damper or dampers during normal operation of the vehicle. Peaks of torque fluctuations which are attributable, for example, to improper operation of the vehicle are taken up by the slip clutch so that the power train is adequately protected against overstressing.

While the drawing shows that the damper 13 is located radially inwardly of the slip clutch or slip clutches, it is possible to place the damper radially outwardly of the slip clutch. Furthermore, and while it is preferred to employ a diaphragm spring (such as 34) which causes the slip clutch to transmit a minimal torque as well as a variable or regulatable torque, it is also within the purview of the invention to employ one or more first springs which ensure that the slip clutch can transmit a minimal torque and to employ one or more second springs which regulate the transmission of torque within the variable range.

In those embodiments of the slip clutch which employ one or more flyweights, the magnitude of slip torque can be regulated as a function of the RPM of the flywheel 3, as a function of the RPM of the flywheel 4 or as a function of the RPM of both flywheels.

As mentioned above, the slip clutch or slip clutches can be designed in such a way that they can transmit a first torque in the drive direction and an identical or nearly identical second torque in the coast direction. However, it is also possible (as already described hereinbefore) to design one or more slip clutches in such a way that they transmit, in the drive direction, a torque whose magnitude exceeds that of torque which can be transmitted in the coast direction. This can be accomplished in a number of ways, for example, by increasing the number and/or the combined area of friction surfaces which are active in the drive direction. Alternatively, the same or a similar result can be accomplished by causing a slip clutch to transmit minimal torque in the coast direction and to transmit such minimal torque as well as a superimposed variable second torque in the drive direction. The means for ensuring the transmission of second torque can be coupled with one of the flywheels by a suitable freewheel arrangement or the like. The freewheel arrangement is blocked in the drive direction but is effective in the coast direction. Under many operating conditions, the slip torque is or can be constant in the coast direction but is variable in the drive direction. The arrangement may be such that the torque which can be transmitted by the slip clutch in the coast direction during stoppage of the engine is identical with torque which can be transmitted in the drive direction when the engine is at a standstill; however, the torque increases with increasing RPM in the drive direction. In accordance with a presently preferred embodiment, the curve denoting the rate of increase of torque which is transmitted by the slip clutch while the RPM increases is or resembles a parabola. This can apply for the drive direction as well as for the coast direction.

The construction of the apparatus wherein one of several slip clutches transmits a minimal torque and another of several slip clutches transmits a variable torque, whose magnitude can be altered as a function of changes of centrifugal force, is preferred under many circumstances because the apparatus exhibits a highly pronounced versatility. The arrangement is preferably such that the magnitude of torque which can be transmitted by the other slip clutch, at least starting at the idling RPM of the engine and at least in the drive direction, exceeds or at least equals that torque which is transmitted by the engine. As mentioned above, the minimal torque should preferably suffice to ensure that the engine can be started by pushing the vehicle as well as that the vehicle cannot roll along a sloping terrain when the engine is idle and the change-speed transmission is not in neutral.

The generation of noise can be reduced, at least substantially, during starting and during turning off of the engine if the magnitude of torque which can be transmitted by the slip clutch is reduced considerably and practically to zero when the engine is at a standstill. This renders it desirable to provide the aforediscussed blocking means which operates between the two flywheels and couples such flywheels to each other as long as the engine is at a standstill.

If the apparatus comprises several slip clutches, the blocking means can be designed to couple the two flywheels against rotation relative to each other through the medium of that slip clutch whose torque is adjustable as a function of changes of centrifugal force. Such construction ensures the establishment of a torque transmitting connection between the engine and the change-speed transmission when the engine is at a standstill. The blocking means can be designed to act directly between the flywheel 3 and the shaft 10, i.e., the power flow need not take place by way of the flywheel 4 and friction clutch 7.

The provision of a blocking device which is operative between a slip clutch whose torque can be varied as a function of changes of centrifugal force and one of the flywheels, and which is effective in one of the two directions only, renders it possible to alter the magnitude of slip torque as a function of the direction of rotation in a particularly simple and efficient way. The blocking means for the just described purpose can be designed in such a way that the centrifugal force-controlled slip clutch is operative between the flywheels in the drive direction and that its torque is at least reduced in the coast direction.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transmitting rotary motion between the output element of the internal combustion engine and the input element of the change-speed transmission in a motor vehicle, comprising a first flywheel connectable to and arranged to receive torque from the output element in the drive direction; a second flywheel rotatable relative to the first flywheel and connectable with the input element to rotate the latter in the drive direction and to be rotated by the input element in the coast direction; at least one slip clutch operating between said flywheels to transmit torque in either of said directions; and means for regulating the magnitude of said torque in at least one of said directions.

2. The apparatus of claim 1, further comprising a friction clutch operatively connected with said second flywheel and arranged to transmit torque between said second flywheel and the input element.

3. The apparatus of claim 1, wherein said regulating means comprises means for varying the magnitude of said torque within a first range in the drive direction and means for varying the magnitude of said torque within a different second range in the coast direction.

4. The apparatus of claim 1, wherein said regulating means comprises means for varying the magnitude of said torque as a function of variations of at least one variable parameter.

5. The apparatus of claim 4, wherein said parameter is the extent to which one of said flywheels is angularly displaced relative to the other of said flywheels.

6. The apparatus of claim 4, wherein said parameter is the angular velocity.

7. The apparatus of claim 4, wherein said parameter is the extent of deviation of angular movement from a constant angular movement.

8. The apparatus of claim 4, wherein said parameter is the acceleration.

9. The apparatus of claim 4, wherein said parameter is torque.

10. The apparatus of claim 4, wherein said parameter is torque which is transmitted by one of said flywheels to the other of said flywheels.

11. The apparatus of claim 4, wherein said parameter is the rotational speed.

12. The apparatus of claim 1, wherein said regulating means comprises means for varying the magnitude of said torque in dependency on variations of at least one operational parameter of said first flywheel.

13. The apparatus of claim 1, wherein said regulating means comprises means for varying the magnitude of said torque in dependency on variations of at least one operational parameter of said second flywheel.

14. The apparatus of claim 1, wherein said regulating means comprises means for varying the magnitude of said torque as a function of variations of at least one operational parameter of one of said flywheels with reference to variations of at least one operational parameter of the other of said flywheels.

15. The apparatus of claim 1, further comprising means for altering the extent of regulation of the magnitude of said torque by said regulating means.

16. The apparatus of claim 15, wherein said altering means comprises means for altering the extent of regulation of said torque as a function of time.

17. The apparatus of claim 1, wherein said clutch comprises means for transmitting a predetermined minimal torque and for transmitting a variable torque which is superimposed upon said predetermined torque.

18. The apparatus of claim 17, wherein said regulating means includes means for varying the magnitude of said variable torque as a function of variations of centrifugal force.

19. The apparatus of claim 1, wherein said regulating means comprises means for varying the magnitude of said torque as a function of variations of centrifugal force up to a predetermined maximum magnitude.

20. The apparatus of claim 19 for transmitting rotary motion between the output element of the internal combustion engine which is arranged to transmit a predetermined nominal torque and the input element of a change-speed transmission in a motor vehicle, wherein said slip clutch is arranged to transmit a predetermined minimum torque exceeding by between 5 and 50% the nominal torque of the internal combustion engine.

21. The apparatus of claim 19 for transmitting rotary motion between the output element of the internal combustion engine which is arranged to transmit a predetermined nominal torque and the input element of a change-speed transmission in a motor vehicle, wherein said slip clutch is arranged to transmit a predetermined minimum torque exceeding by between 7 and 40% the nominal torque of the internal combustion engine.

22. The apparatus of claim 1 for transmitting rotary motion between the output element of the internal combustion engine which is arranged to transmit a predetermined nominal torque and the input element of a change-speed transmission in a motor vehicle, wherein overall torque which can be transmitted by said clutch and the nominal torque of the engine is between 1.1 and 3.5 times such nominal torque.

23. The apparatus of claim 1, further comprising damper means interposed between said flywheels, said slip clutch being disposed radially outwardly of said damper means with reference to the axes of said flywheels.

24. The apparatus of claim 1, further comprising damper means interposed between said flywheels, said damper means being disposed radially outwardly of said clutch with reference to the axes of said flywheels.

25. The apparatus of claim 1, wherein said clutch includes means for transmitting a predetermined minimum torque and for transmitting a variable second torque.

26. The apparatus of claim 1, wherein said regulating means comprises a stressed diaphragm spring which is constructed and arranged to transmit a force whose magnitude is a function of variations of centrifugal force.

27. The apparatus of claim 26, wherein said diaphragm spring is arranged to transmit a force whose magnitude increases in response to increasing centrifugal force.

28. The apparatus of claim 26, wherein said slip clutch comprises a friction generating element and said spring comprises a first annular portion reacting against one of said flywheels and a second annular portion bearing against said element with a force whose magnitude increases in response to increasing centrifugal force, said first and second portions being offset relative to each other in the axial direction of said flywheels.

29. The apparatus of claim 1, wherein said slip clutch comprises two axially spaced-apart friction surfaces arranged to rotate with one of said flywheels, one of said surfaces being movable axially toward and away from the other of said surfaces, a disc-shaped intermediate member interposed between said surfaces, and damper means interposed between said intermediate member and the other of said flywheels.

30. The apparatus of claim 1, wherein said slip clutch comprises two annular friction surfaces arranged to rotate with said first flywheel, a disc-shaped intermediate member disposed between said surfaces, one of said surfaces being movable axially toward and away from the other of said surfaces, and a pressure transmitting member adjacent to said one surface, said regulating means comprising a diaphragm spring reacting against said first flywheel and having tongues bearing against said pressure transmitting member in a direction to urge said one surface toward said other surface.

31. The apparatus of claim 30, wherein said spring includes a radially outermost portion which reacts against said first flywheel and said tongues extend radially inwardly from and are axially offset relative to said outermost portion.

32. The apparatus of claim 30, wherein said first flywheel includes a sleeve and said diaphragm spring reacts against said sleeve.

33. The apparatus of claim 32, wherein said sleeve includes a ring-shaped member and said spring reacts against said ring-shaped member.

34. The apparatus of claim 1, wherein said slip clutch comprises at least one flyweight which is movable under the action of centrifugal force and resilient means arranged to oppose the movement of said flyweight.

35. The apparatus of claim 34, wherein said flyweight is arranged to stress said resilient means in response to increasing rotational speed.

36. The apparatus of claim 34, wherein said resilient means forms part of said regulating means and is arranged to alter the slip torque of said clutch.

37. The apparatus of claim 34, wherein said resilient means comprises a diaphragm spring.

38. The apparatus of claim 34, wherein said resilient means includes means for increasing the slip torque of said clutch under the action of said flyweight.

39. The apparatus of claim 34, wherein said flyweight has a substantially frustoconical surface in engagement with said resilient means.

40. The apparatus of claim 34, further comprising means for guiding said flyweight for movement substantially radially of said flywheels.

41. The apparatus of claim 34, further comprising means for blocking further movement of said flyweight under the action of centrifugal force in response to an increase of the RPM of said flyweight beyond a predetermined value.

42. The apparatus of claim 34, wherein said slip clutch further comprises two annular friction surfaces arranged to rotate with one of said flywheels and an intermediate disc between said friction surfaces, said flyweight being mounted on and being movable substantially radially of said disc and being in contact with at least one of said surfaces.

43. The apparatus of claim 42, further comprising damper means interposed between said disc and the other of said flywheels.

44. The apparatus of claim 42, wherein said flyweight tapers in the radial direction of said flywheels.

45. The apparatus of claim 42, wherein said flyweight has at least one friction surface in contact with said one annular friction surface.

46. The apparatus of claim 45, wherein the inclination of the friction surface on said flyweight at least approximates the inclination of said one annular friction surface.

47. The apparatus of claim 42, wherein one of said friction surfaces is movable axially toward and away from the other of said friction surfaces, said resilient means including means for biasing said one friction surface toward said other friction surface.

48. The apparatus of claim 1, wherein said regulating means includes means for varying the torque in one of said directions in accordance with a predetermined pattern and for varying the torque in the other of said directions at least substantially in accordance with said predetermined pattern.

49. The apparatus of claim 1, wherein said slip clutch comprises means for transmitting a greater torque in the drive direction and a lesser torque in the coast direction.

50. The apparatus of claim 1, wherein said slip clutch includes means for transmitting a substantially constant torque in said coast direction and a variable torque in said drive direction.

51. The apparatus of claim 1, wherein said slip clutch comprises means for transmitting a first torque in the drive direction while the engine is idle and a second torque in the coast direction while the engine is idle, the magnitude of said first torque being at least substantially identical with the magnitude of said second torque.

52. The apparatus of claim 51, wherein said slip clutch comprises means for increasing said first torque in response to increasing RPM of the engine.

53. The apparatus of claim 1, comprising a first slip clutch arranged to transmit a minimal torque and a second slip clutch, said regulating means including means for varying the torque which is transmitted by said second clutch as a function of variations of centrifugal force.

54. The apparatus of claim 1, wherein said regulating means comprises means for varying said torque as a function of variations of centrifugal force and further comprising means for blocking rotation of one of said flywheels with reference to said clutch in one of said directions.

55. The apparatus of claim 54, wherein said blocking means comprises means for blocking rotation of said one flywheel relative to said slip clutch in said drive direction and for at least partially reducing said torque in the coast direction.

56. The apparatus of claim 1, further comprising means for locking said flywheels to each other when the engine is idle.

57. The apparatus of claim 56, wherein said regulating means includes means for varying the magnitude of said torque as a function of variations of centrifugal force and said locking means includes means for blocking said slip clutch.

* * * * *